C. H. WILCKEN.

VEHICLE SPRING.

APPLICATION FILED APR. 8, 1915.

Reissued July 27, 1915.

13,955.

Witnesses=
O M Kappler
Mary Gladwell

Inventor
Charles H. Wilcken
By Fay, Oberlin and Fay
Attorneys

UNITED STATES PATENT OFFICE.

CHARLES H. WILCKEN, OF INDIANAPOLIS, INDIANA.

VEHICLE-SPRING 13,955. Specification of Reissued Letters Patent. Reissued July 27, 1915.

Original No. 1,034,551, dated August 6, 1912, Serial No. 638,530. Application for reissue filed April 8, 1915. Serial No. 20,055.

*To all whom it may concern:*

Be it known that I, CHARLES H. WILCKEN, a citizen of the United States, residing at Indianapolis, in the county of Marion, and State of Indiana, have invented a new and useful Vehicle-Spring, of which the following is a specification.

It is the object of the present invention to provide a leaf spring for a vehicle, or the like, the spring consisting of a plurality of leaves having alined openings, defining a chamber within the spring, which chamber is adapted to receive a lubricant, the contacting faces of the leaves being lubricated, by the contents of the chamber, thereby insuring an even movement of the spring, and lengthening the life thereof.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
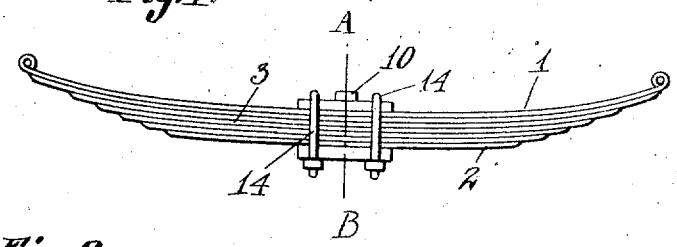
Figure 2:
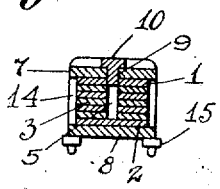
Figure 3:
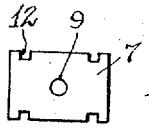
Figure 4:
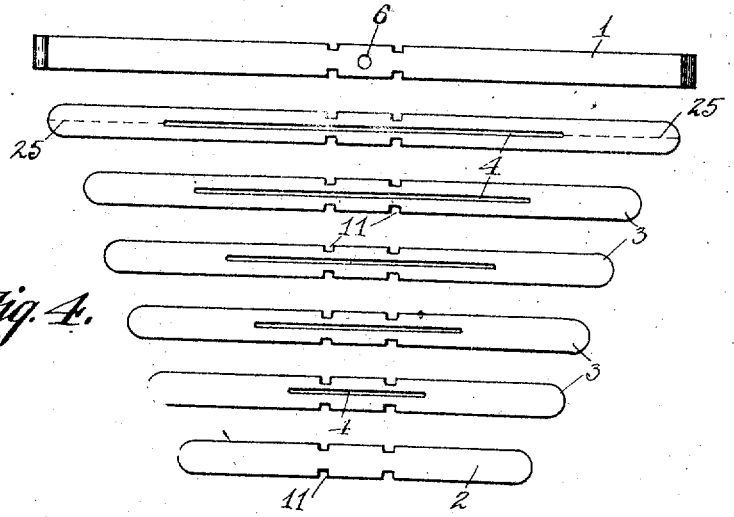

In the drawings, Figure 1 is a side elevation of the complete spring; Fig. 2 is a section on the line A—B of Fig. 1; Fig. 3 is a plan of one of the blocks; and Fig. 4 is a plan of the several leaves.

In carrying out the invention there is provided an outer leaf 1, preferably the longest leaf of the series, and another outer leaf 2 ordinarily the shortest leaf of the series. Between the outer leaves 1 and 2, a series of intermediate leaves 3 are disposed. There may be any number of these intermediate leaves, and their lengths will be regulated, as may be desired.

The leaves 3 are longitudinally slotted, intermediate their edges, as shown at 4, so that when the leaves are superposed upon each other, a lubricant-receiving chamber 5 will be fashioned within the contour of the spring, the outer plates 2 being imperforate, to constitute a complete closure for one side of the chamber 5, the outer leaf 1 being provided with a reduced opening 6, constituting an inlet to the lubricant-receiving chamber.

Upon the leaf 1 is superposed a block 7, and beneath the leaf 2 is placed a block 8. The block 7 is provided with an inlet opening 9, alining with the opening 6 in the leaf 1, and into the opening 9 may be inserted a closure plug 10 of any desired sort.

The leaves 1, 3 and 2 are notched at spaced points, in their edges, as shown at 11, and the blocks 7 and 8 are similarly notched, as shown at 12, the notches 11 and 12 serving to receive a pair of clips 14, of arched form, to the lower ends of which, nuts 15 are applied, the nuts 15 engaging with the plate 8.

It will be seen that by removing the closure plug 10, the lubricant may be introduced into the chamber 5, through the inlets 6—9 the leaves of the spring being lubricated, for movement upon each other.

The slots 4 may be cut directly into the leaves, or, if desired, each leaf may consist of separate parts, united along the dotted line 25, as shown in Fig. 4.

Having thus described the invention, what is claimed is:—

1. A multi-ply leaf spring consisting of outer leaves, and intermediate leaves between the outer leaves, the intermediate leaves being longitudinally slotted, in alinement, to define a lubricant-receiving chamber within the spring; one of the outer leaves being imperforate, to constitute a closure for the chamber, the other outer leaf constituting likewise a closure for the chamber, but being provided with a reduced inlet, whereby a lubricant may be introduced within the chamber.

2. A device of the class described comprising a multi-ply leaf spring, consisting of outer leaves, and intermediate leaves between the outer leaves, one of the outer leaves being imperforate, and the intermediate leaves being longitudinally slotted, to define a lubricant-receiving chamber within the spring; the other of the outer leaves constituting a partial closure for the chamber, but being provided with an inlet; blocks disposed on the outer plates one of the blocks being provided with an inlet, alining with the inlet in the outer plate; a closure for the inlet in the block; and clips embracing the blocks and the springs.

3. A multi-ply leaf spring, consisting of outer leaves, and intermediate leaves between the outer-leaves, the intermediate leaves being longitudinally slotted, in alinement, to define a lubricant-receiving chamber within the spring.

4. A multi-ply leaf spring, consisting of outer leaves, and intermediate leaves between the outer leaves, the intermediate leaves being longitudinally slotted, in alinement, to define a lubricant-receiving chamber within the spring; and one of the leaves being provided with an inlet opening, whereby lubricant may be introduced within the chamber.

Signed by me this 3 day of April, 1915.

CHARLES H. WILCKEN.

Attested by—

WALTER A. BROWN,

MARY E. REGER.